United States Patent
Ohms et al.

(10) Patent No.: US 8,381,570 B2
(45) Date of Patent: Feb. 26, 2013

(54) METHOD FOR ADJUSTING AN ACCELERATION SENSOR

(75) Inventors: Torsten Ohms, Vaihingen/Enz-Aurich (DE); Axel Franke, Ditzingen (DE)

(73) Assignee: Robert Bosch GmbH, Stuttgart (DE)

(*) Notice: Subject to any disclaimer, the term of this patent is extended or adjusted under 35 U.S.C. 154(b) by 287 days.

(21) Appl. No.: 12/927,345

(22) Filed: Nov. 12, 2010

(65) Prior Publication Data
US 2011/0120208 A1    May 26, 2011

(30) Foreign Application Priority Data
Nov. 23, 2009  (DE) .................. 10 2009 047 018

(51) Int. Cl.
*G01P 21/00*   (2006.01)
*G01P 15/18*   (2006.01)
(52) U.S. Cl. ...... 73/1.38; 73/1.37; 73/514.01; 73/514.02
(58) Field of Classification Search .................. 73/1.37, 73/1.38, 514.01, 514.02
See application file for complete search history.

(56) References Cited

U.S. PATENT DOCUMENTS

| | | | |
|---|---|---|---|
| 5,249,465 A * | 10/1993 | Bennett et al. ................... | 73/510 |
| 5,500,549 A * | 3/1996 | Takeuchi et al. ............... | 257/415 |
| 5,618,989 A | 4/1997 | Marek | |
| 5,969,225 A * | 10/1999 | Kobayashi ..................... | 73/1.37 |
| 6,536,280 B1 * | 3/2003 | Carley ......................... | 73/504.02 |
| 6,631,642 B2 * | 10/2003 | Oguchi et al. ................. | 73/514.32 |
| 6,810,738 B2 * | 11/2004 | Sakaguchi ..................... | 73/510 |
| 7,134,336 B2 * | 11/2006 | Mase et al. ................... | 73/504.12 |
| 7,350,394 B1 * | 4/2008 | Flynn et al. ................... | 73/1.38 |
| 7,355,318 B2 * | 4/2008 | Dean et al. .................... | 310/309 |
| 7,757,393 B2 * | 7/2010 | Ayazi et al. ................... | 29/847 |
| 8,156,783 B2 * | 4/2012 | Beer ............................ | 73/1.38 |
| 2004/0007064 A1 * | 1/2004 | Sakaguchi ..................... | 73/488 |
| 2005/0066704 A1 * | 3/2005 | Tanten et al. .................. | 73/1.88 |
| 2006/0005603 A1 * | 1/2006 | Chau et al. .................... | 73/1.38 |
| 2008/0178674 A1 * | 7/2008 | Walmsley ..................... | 73/514.01 |
| 2010/0011835 A1 * | 1/2010 | Beer ............................ | 73/1.38 |

* cited by examiner

*Primary Examiner* — David Rogers
(74) *Attorney, Agent, or Firm* — Kenyon & Kenyon LLP

(57) ABSTRACT

A method for adjusting an acceleration sensor which includes a substrate and a seismic mass, the acceleration sensor having first and further first electrodes attached to the substrate on a first side, counter-electrodes of the seismic mass being situated between the first and further first electrodes, the acceleration sensor having further second electrodes on a second side and further fourth electrodes on a fourth side opposite the second side, an essentially equal first excitation voltage being applied to the first and further first electrodes in a first step for exciting a first deflection of the seismic mass along a first direction, the first deflection being compensated in a second step by applying a first compensation voltage to the further second and further fourth electrodes.

17 Claims, 1 Drawing Sheet

METHOD FOR ADJUSTING AN ACCELERATION SENSOR

BACKGROUND OF THE INVENTION

1. Field of the Invention

The present invention is directed to a method for adjusting an acceleration sensor.

2. Description of the Related Art

Methods of this type are generally known. For example, a capacitive acceleration sensor is known from the publication U.S. Pat. No. 5,618,989 A, including at least one movable seismic mass, the seismic mass being deflectable by an acceleration, and including at least one movable electrode which is situated opposite at least one stationary electrode and forms a measuring capacitance therewith, at least one further stationary electrode being provided, it being possible to apply an electric voltage to the further electrode in such a way that a force is applied to the seismic mass. The further electrode is used to perform a self test of the acceleration sensor, a deflection of the seismic mass relative to the substrate being achieved during the self test, not by an acceleration force, but by an electrostatic interaction between the further electrodes and the seismic mass simulating a deflection of the seismic mass relative to the substrate. In this way, it is possible to test or adjust the acceleration sensor without a real acceleration force having to be present.

SUMMARY OF THE INVENTION

The method according to the present invention for adjusting an acceleration sensor and the acceleration sensor according to the present invention have the advantage over the related art that a much simpler and more economical adjustment of the acceleration sensor is made possible. In particular, compared to the related art, no additional structures are needed to adjust the acceleration sensor or additional terminal pads for contacting the additional structures, which advantageously saves wafer space and thus costs. In the method according to the present invention, only such electrodes which are already implemented in a two-axis and/or multi-axis acceleration sensor are advantageously used to adjust the acceleration sensor. These advantages are achieved by the fact that the first deflection of the seismic mass is generated with the aid of the first and further first electrodes. The first and further first electrodes, between which the counter-electrodes of the seismic mass are situated, are part of a first differential capacitance system which is provided for differential evaluation of an acceleration of the seismic mass relative to the substrate perpendicular to the first direction in the operating mode of the acceleration sensor. To produce the first deflection, the first and further first electrodes are together connected to an essentially equal potential. As a result, the counter-electrodes undergo a deflection force along the first direction, due to electrostatic interaction with the first and the further first electrodes. The counter-electrodes are "drawn," in particular, into the gap between the first and further first electrodes, so that the seismic mass moves relative to the substrate in the direction of the first and further electrodes. This movement is compensated by the first compensation voltage, which is applied to the further second and further fourth electrodes. The further second electrodes, in particular, are part of a second differential capacitance system on the second side of the acceleration sensor, which has the further second electrodes and second electrodes, counter-electrodes of the seismic mass again being situated between the further second electrodes and the second electrodes, and the second differential capacitance system being provided for differential evaluation of an acceleration of the seismic mass parallel or antiparallel to the first direction in the operating mode of the acceleration sensor. Similarly, the further fourth electrode [s], in particular, are part of a fourth differential capacitance system which is situated on the opposite side and is also provided for differential evaluation of an acceleration of the seismic mass parallel or antiparallel to the first direction. The second and fourth directions are preferably oriented perpendicularly to the first direction. The first deflection now produces an increase in distance (or alternatively a decrease in distance) between the further second electrodes and the corresponding counter-electrodes, or between the further fourth electrodes and the corresponding counter-electrodes, the change in distance being compensated by the first compensation voltage applied to the further second and further fourth electrodes. The intensity of the first compensation voltage may thus be used as a measure for adjusting the acceleration sensor. An adjustment of this type is preferably carried out during operation, in the position of use and/or at the installation location of the acceleration sensor. Alternatively, the method according to the present invention is carried out during or immediately after the manufacture of the acceleration sensor. The acceleration sensor is preferably provided for operation in a safety and/or comfort system of a motor vehicle, the acceleration sensor, in particular, preferably including a two-axis acceleration sensor having only one seismic mass for detecting two orthogonal accelerations (for example, longitudinal vehicle axis for the "hill hold" function and transverse axis for an ESP system). The acceleration sensor includes, in particular, a micromechanical acceleration sensor. The substrate preferably includes a semiconductor substrate and, in particular, preferably a silicon substrate.

Exemplary embodiments of the present invention are illustrated in the drawings and explained in greater detail in the following description.

DETAILED DESCRIPTION OF THE INVENTION

Figure 1:
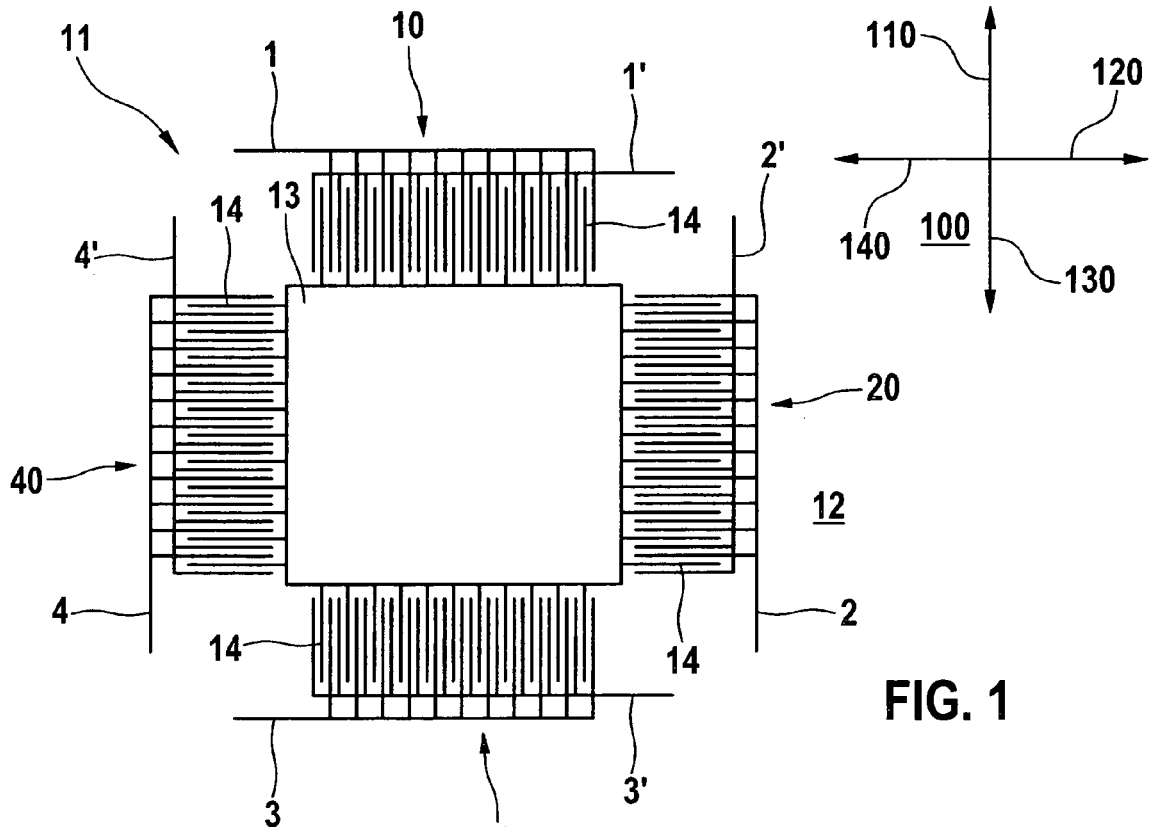
FIG. 1 shows an acceleration sensor according to a first specific embodiment of the present invention.

According to a preferred refinement, it is provided that the acceleration sensor has third and further third electrodes attached to the substrate on a third side opposite the first side, counter-electrodes of the seismic mass being situated between the third and further third electrodes, and the acceleration sensor furthermore having second electrodes on the second side and fourth electrodes on the fourth side, an essentially equal second excitation voltage being applied to the third and further electrodes in a third step for exciting a second deflection of the seismic mass along a third direction, the second deflection being compensated in a fourth step by applying a second compensation voltage to the second and fourth electrodes. In particular, the third direction is antiparallel to the first direction, so that an adjustment of the acceleration sensor is advantageously made possible in both directions, both parallel and antiparallel to the first direction. In an advantageous manner, the acceleration sensor is preferably provided with a symmetrical design in such a way that an adjustment along the first direction replaces an adjustment along the third direction.

According to a further preferred refinement, it is provided that counter-electrodes of the seismic mass are situated between the second and further second electrodes, an essentially equal third excitation voltage being applied to the second and further second electrodes in a fifth step for exciting a third deflection of the seismic mass along a second direction, the third deflection being compensated in a sixth step by applying a third compensation voltage to the further first and further third electrodes. In particular, the second direction is perpendicular to the first direction so that an adjustment of the acceleration sensor is advantageously made possible along the first direction as well as perpendicularly to the first direction.

According to a further preferred refinement, it is provided that counter-electrodes of the seismic mass are situated between the fourth and further fourth electrodes of the seismic mass, an essentially equal fourth excitation voltage being applied to the fourth and further fourth electrodes in a seventh step for exciting a fourth deflection of the seismic mass along a fourth direction, the fourth deflection being compensated in an eighth step by applying a fourth compensation voltage to the first and third electrodes. In particular, the fourth direction is antiparallel to the second direction, so that an adjustment of the acceleration sensor is advantageously made possible perpendicularly to the first direction as well as both parallel and antiparallel to the second direction.

A further subject matter of the present invention is a method for adjusting an acceleration sensor, the acceleration sensor having third and further third electrodes attached to the substrate on a third side opposite the first side, the acceleration sensor furthermore having second electrodes on the second side and fourth electrodes on the fourth side, counter-electrodes of the seismic mass being situated between the second and further second electrodes, between the third and further third electrodes and between the fourth and further fourth electrodes, the acceleration sensor having a junction electrode which is fixed relative to the substrate and extends largely parallel to a main extension plane of the substrate and at least partially overlaps the seismic mass perpendicularly to the main extension plane, an essentially equal fifth excitation voltage being applied in a ninth step to the first, further first, third and further third electrodes for exciting a fifth deflection of the seismic mass along the fifth direction, the fifth deflection being compensated in a tenth step by applying a fifth compensation voltage to the junction electrode. Thus, an adjustment of the acceleration sensor with regard to the fifth direction perpendicular to the main extension plane is advantageously made possible, no additional structures being needed, compared to the related art. The method according to the present invention may thus be advantageously used for "in-plane" sensors as well as for "out-of-plane" sensors. In particular, the acceleration sensor is designed in such a way that the fifth deflection is induced by an asymmetry between the particular top and bottom sides of the first, further first, third and further third electrodes, so that an electrostatic differential force acts upon the seismic mass in the direction of the substrate or oriented away from the substrate when the fifth excitation voltage is applied. The junction electrode is preferably situated between the substrate and the seismic mass, perpendicular to the main extension plane. Alternatively, the junction electrode includes a flat cover electrode, and/or the acceleration sensor includes a further junction electrode in the form of a flat cover electrode in such a way that the seismic mass is situated between the cover electrode and the substrate, perpendicular to the main extension plane.

According to a further preferred refinement, it is provided that the fifth excitation voltage is also applied to the second, further second, fourth and further fourth electrodes in the ninth step, so that a comparatively uniform fifth deflection is advantageously achieved. For example, the occurrence of torques is thus effectively prevented.

According to a further preferred refinement, it is provided that, in an eleventh step, the first excitation voltage is compared with the first compensation voltage, the second excitation voltage is compared with the second compensation voltage, the third excitation voltage is compared with the third compensation voltage, the fourth excitation voltage is compared with the fourth compensation voltage and/or the fifth excitation voltage is compared with the fifth compensation voltage. This makes it possible to advantageously quantify the sensitivity of the acceleration sensor relative to the first, second, third, fourth and/or fifth direction(s) for calibrating the acceleration sensor with regard to the first, second, third, fourth and/or fifth direction(s).

A further subject matter of the present invention is an acceleration sensor which is configured for carrying out a method according to the present invention.

In the different figures, the same components are always provided with the same reference numerals and are therefore, as a rule, also named or mentioned only once in each case.

FIG. 1 shows an acceleration sensor 11 according to a first specific embodiment of the present invention, acceleration sensor 11 including a substrate 12, which has a main extension plane 100, and including a seismic mass 13. Parallel to main extension plane 100, seismic mass 13 has an essentially rectangular structure having four sides: a first side 10, a second side 20, a third side 30 and a fourth side 40. Counter-electrodes 14, which are permanently connected to seismic mass 13, project from seismic mass 13 on each of these first, second, third and fourth sides 10, 20, 30, 40. On first side 10, counter electrodes 14 and first and further first electrodes 1, 1' together form a first differential capacitance system, one counter-electrode 14 always being situated between one first electrode 1 and one further first electrode 1'. A movement of seismic mass 13 relative to substrate 12 along a direction 120 parallel to main extension plane 100 thus shortens the distances between counter-electrodes 14 and first electrode 1 and increases the distances between counter-electrodes 14 and further first electrode 1'. These changes in distance are differentially evaluated and are used to detect an acceleration of acceleration sensor 11 relative to second direction 120. In a manner similar to the first differential capacitance system, acceleration sensor 11 has a second differential capacitance system on second side 20, a third differential capacitance system on third side 30 and a fourth differential capacitance system on fourth side 40. The third differential capacitance system is also used to detect an acceleration of acceleration sensor 11 relative to second direction 120 (i.e., parallel or antiparallel to second direction 120), while the second and fourth differential capacitance systems are used to detect accelerations of acceleration sensor 11 relative to a first direction 110 which is perpendicular to second direction 120 and parallel to main extension plane 100 (i.e., parallel or antiparallel to second direction 120). A method according to the present invention is described below according to a first specific embodiment of the present invention on the basis of FIG. 1, an equal first excitation voltage being first applied to first and further first. electrodes 1, 1' in a first step for exciting a first deflection of seismic mass 13 along first direction 110. Corresponding counter-electrodes 14 are each thereby drawn into the gap between first and further first electrodes 1, 1', on the basis of electrostatic interaction. At the same time, this first deflection is just compensated in a second step by applying a first compensation voltage to further second and further fourth electrodes 2', 4'. A measure of the sensitivity of acceleration sensor 11 toward a deflection in first direction 110 is thus derived from a comparison between the first excitation voltage and the required first compensation voltage. Similarly, an essentially equal second excitation is applied to third and further third electrodes 3, 3' of the third differential capacitance system in a third step for exciting a second deflection of seismic mass 13 along a third direction 130, the second deflection being compensated in a fourth step by applying a second compensation voltage to second and fourth electrodes 2, 4, and a measure of the sensitivity of acceleration sensor 11 toward a deflection in third direction 130 being derived from a comparison between the second excitation voltage and the required second compensation voltage. Furthermore, an essentially equal third excitation voltage is applied to second and further second electrodes 2, 2' of the second differential capacitance system in a fifth step for exciting a third deflection of seismic mass 13 along a second direction 120, the third deflection being compensated in a sixth step by applying a third compensation voltage to further first and further third electrodes 1', 3'. Furthermore, an essentially equal fourth excitation voltage is applied to fourth and further fourth electrodes 4, 4' of the fourth differential capacitance system in a seventh step for exciting a fourth deflection of seismic mass 13 along a fourth direction 140, the fourth deflection being compensated in an eighth step by applying a fourth compensation voltage to first and third electrodes 1, 3. A measure of the sensitivity of acceleration sensor 11 toward a deflection in third or fourth direction 130, 140 is thus also derived from a comparison between the third or fourth excitation voltage and the required third or fourth compensation voltage. This method according to the present invention according to the first specific embodiment of the present invention thus makes it possible to adjust the acceleration sensor with regard to first, second, third and fourth directions 110, 120, 130, 140.

Figure 2:
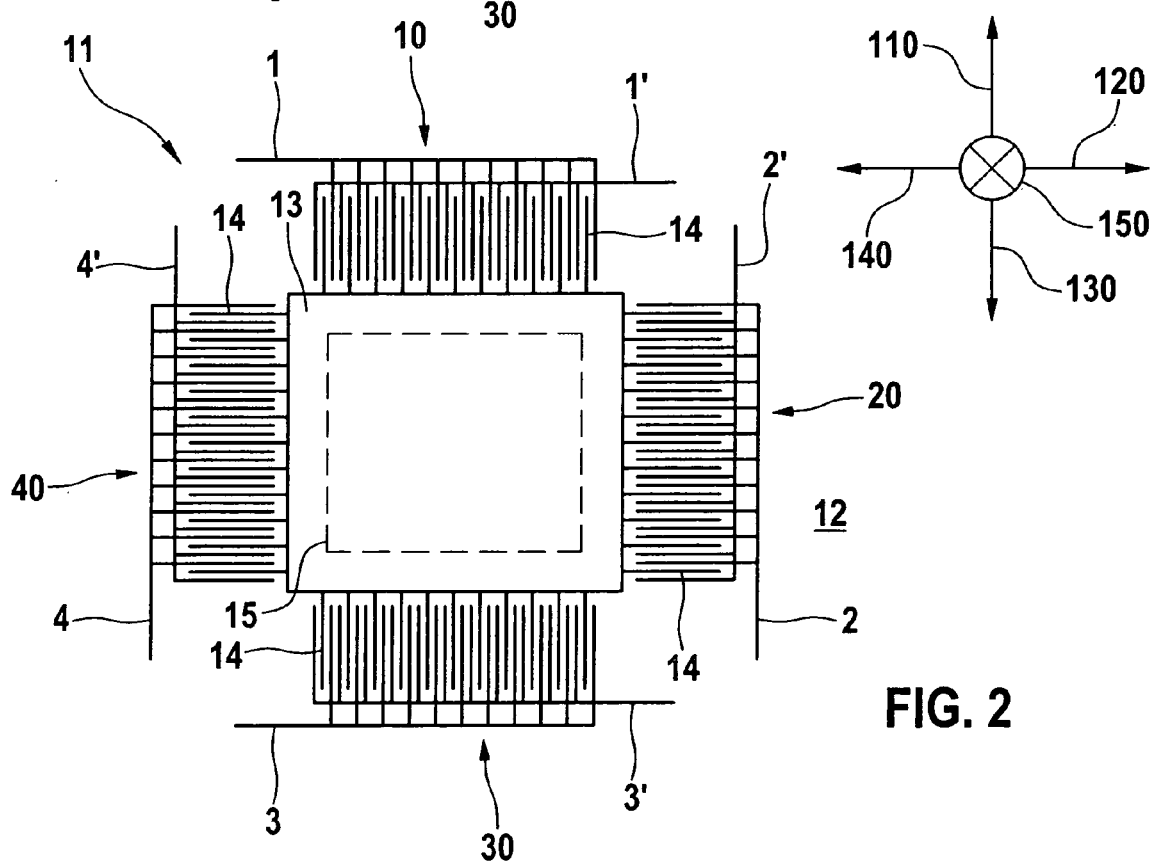
FIG. 2 shows an acceleration sensor according to a second specific embodiment of the present invention.

FIG. 2 shows an acceleration sensor 11 according to a second specific embodiment of the present invention, which is largely identical to acceleration sensor 11 illustrated in FIG. 1, acceleration sensor 11 including a junction electrode 15 which is permanently connected to substrate 12 and which is situated between substrate 12 and seismic mass 13 perpendicularly to substrate 12, i.e., along a fifth direction 150. In a ninth step, which is carried out, in particular, after the eighth step described in FIG. 1, an essentially equal fifth excitation voltage is applied to first, further first, second, further second, third, further third, fourth and further fourth electrodes 1, 1', 2, 2', 3, 3', 4, 4' for exciting a fifth deflection of the seismic mass along fifth direction 150, the fifth deflection being compensated in a tenth step by applying a fifth compensation voltage to junction electrode 15, thereby achieving an adjustment of acceleration sensor 11 with regard to fifth direction 150. Alternatively, acceleration sensor 11 includes a further junction electrode 15' in the form of a flat cover electrode, so that seismic mass 13 is situated between substrate 12 and further junction electrode 15 along fifth direction 150, thus making it possible to carry out an adjustment antiparallel to fifth direction 150.

What is claimed is:

1. A method for adjusting an acceleration sensor which has a substrate and a seismic mass, the acceleration sensor having first and further first electrodes attached to the substrate on a first side, counter-electrodes of the seismic mass being situated between the first and further first electrodes, the acceleration sensor including further second electrodes on a second side and further fourth electrodes on a fourth side opposite the second side, said method for adjusting comprising:

applying an essentially equal first excitation voltage to the first and further first electrodes in a first step for exciting a first deflection of the seismic mass along a first direction, and compensating the first deflection in a second step by applying a first compensation voltage to the further second and the further fourth electrodes.

2. The method as recited in claim 1, wherein the acceleration sensor has third and further third electrodes attached to the substrate on a third side opposite the first side, counter-electrodes of the seismic mass being situated between the third and further third electrodes, and the acceleration sensor has second electrodes on the second side and fourth electrodes on the fourth side, said method further comprising: applying an essentially equal second excitation voltage to the third and further third electrodes in a third step for exciting a second deflection of the seismic mass along a third direction, and compensating the second deflection in a fourth step by applying a second compensation voltage to the second and fourth electrodes.

3. The method as recited in claim 2, wherein counter-electrodes of the seismic mass are situated between the second and further second electrodes, and wherein an essentially equal third excitation voltage is applied to the second and further second electrodes for exciting a third deflection of the seismic mass along a second direction, the third deflection being compensated by applying a third compensation voltage to the further first and further third electrodes.

4. The method as recited in claim 2, wherein counter-electrodes of the seismic mass are situated between the fourth and further fourth electrodes, an essentially equal fourth excitation voltage being applied to the fourth and further fourth electrodes for exciting a fourth deflection of the seismic mass along a fourth direction, the fourth deflection being compensated by applying a fourth compensation voltage to the first and third electrodes.

5. A method for adjusting an acceleration sensor, as recited in claim 2, wherein the acceleration sensor has third and further third electrodes attached to the substrate on a third side opposite the first side, the acceleration sensor further having second electrodes on the second side and fourth electrodes on the fourth side, counter-electrodes of the seismic mass being situated between the second and further second electrodes, between the third and further third electrodes and between the fourth and further fourth electrodes, the acceleration sensor having a junction electrode which is fixed relative to the substrate and which extends essentially parallel to a main extension plane of the substrate and at least partially overlaps the seismic mass perpendicularly to the main extension plane, said method further comprising applying an essentially equal fifth excitation voltage to the first, further first, third and further third electrodes for exciting a fifth deflection of the seismic mass along the fifth direction, and compensating the fifth deflection by applying a fifth compensation voltage to the junction electrode.

6. The method as recited in claim 2, wherein the first excitation voltage is compared with the first compensation voltage and the second excitation voltage is compared with the second compensation voltage.

7. The method as recited in claim 1, wherein counter-electrodes of the seismic mass are situated between the second and further second electrodes, and wherein an essentially equal third excitation voltage is applied to the second and further second electrodes for exciting a third deflection of the seismic mass along a second direction, the third deflection being compensated by applying a third compensation voltage to the further first and further third electrodes.

8. The method as recited in claim 7, wherein counter-electrodes of the seismic mass are situated between the fourth and further fourth electrodes, an essentially equal fourth excitation voltage being applied to the fourth and further fourth electrodes for exciting a fourth deflection of the seismic mass along a fourth direction, the fourth deflection being compensated by applying a fourth compensation voltage to the first and third electrodes.

9. A method for adjusting an acceleration sensor, as recited in claim 7, wherein the acceleration sensor has third and further third electrodes attached to the substrate on a third side opposite the first side, the acceleration sensor further having second electrodes on the second side and fourth electrodes on the fourth side, counter-electrodes of the seismic mass being situated between the second and further second electrodes, between the third and further third electrodes and between the fourth and further fourth electrodes, the acceleration sensor having a junction electrode which is fixed relative to the substrate and which extends essentially parallel to a main extension plane of the substrate and at least partially overlaps the seismic mass perpendicularly to the main extension plane, said method further comprising applying an essentially equal fifth excitation voltage to the first, further first, third and further third electrodes for exciting a fifth deflection of the seismic mass along the fifth direction, and compensating the fifth deflection by applying a fifth compensation voltage to the junction electrode.

10. The method as recited in claim 7, wherein the first excitation voltage is compared with the first compensation voltage and the third excitation voltage is compared with the third compensation voltage.

11. The method as recited in claim 1, wherein counter-electrodes of the seismic mass are situated between the fourth and further fourth electrodes, an essentially equal fourth excitation voltage being applied to the fourth and further fourth electrodes for exciting a fourth deflection of the seismic mass along a fourth direction, the fourth deflection being compensated by applying a fourth compensation voltage to the first and third electrodes.

12. A method for adjusting an acceleration sensor, as recited in claim 11, wherein the acceleration sensor has third and further third electrodes attached to the substrate on a third side opposite the first side, the acceleration sensor further having second electrodes on the second side and fourth electrodes on the fourth side, counter-electrodes of the seismic mass being situated between the second and further second electrodes, between the third and further third electrodes and between the fourth and further fourth electrodes, the acceleration sensor having a junction electrode which is fixed relative to the substrate and which extends essentially parallel to a main extension plane of the substrate and at least partially overlaps the seismic mass perpendicularly to the main extension plane, said method further comprising applying an essentially equal fifth excitation voltage to the first, further first, third and further third electrodes for exciting a fifth deflection of the seismic mass along the fifth direction, and compensating the fifth deflection by applying a fifth compensation voltage to the junction electrode.

13. The method as recited in claim 11, wherein the first excitation voltage is compared with the first compensation voltage and the fourth excitation voltage is compared with the fourth compensation voltage.

14. A method for adjusting an acceleration sensor, as recited in claim 1, wherein the acceleration sensor has third and further third electrodes attached to the substrate on a third side opposite the first side, the acceleration sensor further having second electrodes on the second side and fourth electrodes on the fourth side, counter-electrodes of the seismic mass being situated between the second and further second electrodes, between the third and further third electrodes and between the fourth and further fourth electrodes, the acceleration sensor having a junction electrode which is fixed relative to the substrate and which extends essentially parallel to a main extension plane of the substrate and at least partially overlaps the seismic mass perpendicularly to the main extension plane, said method further comprising applying an essentially equal fifth excitation voltage to the first, further first, third and further third electrodes for exciting a fifth deflection of the seismic mass along the fifth direction, and compensating the fifth deflection by applying a fifth compensation voltage to the junction electrode.

15. The method as recited in claim 14, wherein the fifth excitation voltage is also applied to the second, further second, fourth and further fourth electrodes.

16. The method as recited in claim 1, wherein the first excitation voltage is compared with the first compensation voltage.

17. An acceleration sensor which is configured for carrying out the method as recited in claim 1.

* * * * *